United States Patent [19]

Franz et al.

[11] Patent Number: 4,780,140

[45] Date of Patent: Oct. 25, 1988

[54] PLATELET-SHAPED IRON OXIDE PIGMENTS

[75] Inventors: Klaus D. Franz, Kelkheim; Reiner Esselborn, Darmstadt, both of Fed. Rep. of Germany; Ralf Emmert, Bayonne, N.J.; Hans D. Brückner, Mühltal, Fed. Rep. of Germany

[73] Assignee: Merck Patent Gesellschaft mit Beschränkter Haftung, Darmstadt, Fed. Rep. of Germany

[21] Appl. No.: 111,340

[22] Filed: Oct. 22, 1987

[30] Foreign Application Priority Data

Oct. 23, 1986 [DE] Fed. Rep. of Germany ....... 3636076

[51] Int. Cl.$^4$ .............................................. C09D 11/00
[52] U.S. Cl. .................................... 106/20; 106/415; 106/418; 106/459; 501/11

[58] Field of Search ................. 106/20, 304, 291, 299, 106/296, 302; 501/11

[56] References Cited

U.S. PATENT DOCUMENTS 3,030,307  4/1962  Baird et al. ....................... 252/62.58
4,373,963  2/1983  Uenishi et al. ...................... 106/304

FOREIGN PATENT DOCUMENTS 0158131  12/1980  Japan ................................... 106/304

*Primary Examiner*—Theodore Morris
*Attorney, Agent, or Firm*—Millen & White

[57] ABSTRACT

The invention relates to platelet-shaped pigments of the formula $Al_xFe_{2-x}O_{3-y}$, wherein x has a value from 0.02 to 0.5 and y has a value from 0.3 to 1.0, which are optionally coated with further oxides.

16 Claims, No Drawings

PLATELET-SHAPED IRON OXIDE PIGMENTS

BACKGROUND OF THE INVENTION

The invention relates to platelet-shaped pigments based on iron oxide which contain aluminum oxide in solid solution.

There is a continuously increasing demand for effect pigments with which metallic-like effects can be achieved, for example, in lacquers, plastics, glass, ceramics or cosmetics. In addition to naturally occurring and synthetic platelet-shaped iron oxides, which can be prepared in different colors and shapes by hydrothermal processes, platelet-shaped iron oxide pigments which contain aluminum oxide incorporated as a solid solution, that is to say in the haematite crystal lattice, are also known from European Patent Specification No. 68,311 and U.S. Pat. No. 4,373,963. These pigments are distinguished by a very good gloss and can be prepared in different sizes and thicknesses and different red shades by varying the process conditions of the hydrothermal process.

It is also known from U.S. Pat. No. 4,373,963 that such pigments can be provided with an external coating of titanium dioxide and in addition to the body color, an interference color which varies according to the layer thickness of the opaque $TiO_2$ layer can thereby be generated.

Although these known pigments are particularly suitable for many applications, there is still a need for pigments with which on the one hand the color range accessible and on the other hand the possible uses of the pigments can be increased.

SUMMARY OF THE INVENTION

It is therefore an object of the invention to provide pigments based on platelet-shaped iron oxides, having a wider color range and greater variety of uses than those previously available.

Upon further study of the specification and appended claims, further objects and advantages of this invention will become apparent to those skilled in the art.

These objects have been satisfied by the provision of platelet-shaped iron oxides containing aluminum oxide which can be reduced to give new pigments which have a lower oxygen content and interesting color effects, the shape and gloss being retained.

The invention therefore relates to platelet-shaped pigments based on iron oxide which contain aluminum oxide in solid solution, characterized by the formula $Al_xFe_{2-x}O_{3-y}$, wherein x has a value from 0.02 to 0.5 and y has a value from 0.3 to 1.0.

The invention also relates to a process for the preparation of platelet-shaped pigments of the formula $Al_xFe_{2-x}O_{3-y}$, wherein x has a value from 0.02 to 0.5 and y has a value from 0.3 to 1.0, characterized in that a pigment of the formula $Al_xFe_{2-x}O_3$, wherein x has a value from 0.02 to 0.5, is heated at a temperature of about 200°–800° C. in a reducing atmosphere.

The invention furthermore relates to the use of these pigments for pigmenting lacquers, paints, plastics, fibers, glass, ceramics or cosmetics.

DETAILED DISCUSSION

To prepare the pigments according to the invention, the pigments prepared according to European Patent Specification No. 68,311 or U.S. Pat. No. 4,373,963 are heated in a reducing atmosphere. Examples of reducing gases which may be mentioned here are hydrogen, ammonia, methane and carbon monoxide, which can be used by themselves or as a mixture with one another or also as a mixture with inert gases, such as, for example, nitrogen, argon or steam. A mixture of hydrogen and nitrogen is preferably used for the reduction.

As well as the nature and concentration of the reducing gas, the temperature and the duration of the treatment in particular determine the degree of reduction. If appropriate, the reduction of the iron can be carried out beyond the magnetite stage to complete conversion into iron(II). Intercalation of metallic iron may also arise due to the known disproportionation reaction which thereby occurs. Iron in various stages of reduction may be present in the reduced pigment, i.e., the final pigment may contain an admixture of particles with varying x and y values.

In principle, the reduction can take place at temperatures of 200°–800° C., the times used being about 10 to about 100 minutes. However, the reduction is preferably carried out at a temperature of about 300500° C., the times used being about 20 to about 40 minutes. Black-yellow, black-red to pure black, high-gloss pigments are thereby obtained, depending on the nature of the starting pigment and the degree of reduction.

The reduction can be carried out either continuously or discontinuously in all the apparatuses suitable for this, which are known to the expert. The reduction is preferably carried out in a rotating tubular oven to be charged with a reducing gas.

Another advantageous aspect of the present invention is that the platelet-shaped pigments can be coated with further metal oxides before or after the reduction. Either colorless or colored oxides can be applied here, and the gloss, color and resistance to light and weathering and other properties of the pigments can be widely influenced in a conventional manner.

Other metal oxides which are suitable and can be applied in amounts of about 1 to about 60% by weight, in particular about 20 to about 40% by weight, based on the total weight of the pigment, are, in particular, the oxides of elements of main group and/or subgroup II, IV, V and/or VI of the periodic table. These are, in particular, oxides of zinc, zirconium, titanium, chromium, silicon, tin and bismuth.

These oxides can be found as a discrete layer on the surface of the aluminum iron oxide and are in all cases initially produced as such. However, by annealing the resulting pigments at higher temperatures of about 400° to about 800° C., mixed phases can also be obtained due to the diffusion processes which thereby occur.

The oxides are advantageously precipitated in aqueous suspension. For this, the aluminum iron oxide pigment can be suspended in a solution of a suitable metal salt and the metal oxide can be precipitated by suitable measures, such as, for example, addition of a base or thermal hydrolysis. However, it is also possible for the metal salt to be metered slowly into a suspension of the starting pigment, a pH suitable for the precipitation being maintained by simultaneous addition of a base. Such precipitation processes are known to the expert and are oriented around, for example, the processes described in German Patent Specification Nos. 1,467,468 and 2,009,566 for the precipitation of titanium dioxide on mica flakes. Alternatively, however, the metal oxides can also be precipitated from the gas phase, for example, by thermal decomposition and oxidation of a suitable starting compound in a fluidized bed, as described in European Patent Nos. 33 457 and 45 851 and, if appropriate, such a process can be combined with subsequent reduction of the iron oxide pigment.

Further oxides can be precipitated before or after reduction of the iron oxide. However, if the oxide applied is to be annealed, it is advisable to carry out the reduction afterwards or at the same time as this process, since otherwise reoxidation may occur during annealing.

The invention therefore provides very advantageous pigments with a wide scope of use. Because of their attractive color gloss, the pigments according to the invention can be used as pigments in the decorative field for coloring lacquers, paints, plastics, fibers, glass, ceramics or cosmetics or in the printing field, e.g., as printing inks, completely analogously to conventional iron-oxide pigments. Excepting the pigments according to the invention, all elements in these compositions are conventional, as disclosed in the references noted and their use is fully conventional, e.g., as disclosed in European Patent Specification No. 68,311 and U.S. Pat. No. 4,373,963 which are incorporated by reference herein.

Because of their magnetic properties and electrical conductivity, the pigments of the invention are also suitable for purposes where such effects are relevant and are used fully conventionally in this fashion.

Without further elaboration, it is believed that one skilled in the art can, using the preceding description, utilize the present invention to its fullest extent. The following preferred specific embodiments are, therefore, to be construed as merely illustrative, and not limitative, of the remainder of the disclosure in any way whatsoever.

In the foregoing and in the following examples, all temperatures are set forth uncorrected in degrees Celsius and, unless otherwise indicated, all parts and percentages are by weight.

The entire text of all applications, patents and publications, if any, cited above and below are hereby incorporated by reference.

EXAMPLE 1

50 g of a pigment prepared according to Example 2 of U.S. Pat. No. 4,373,963 are reduced at 500° C. in a gas mixture, flowing at a rate of 100 liter/hour, of 60 parts of nitrogen and 40 parts of hydrogen for 30 minutes. A black, shiny, magnetic pigment with the characteristic lines of magnetite in the Debye-Scherrer spectrum is obtained.

EXAMPLE 2

50 g of a red-violet pigment prepared according to Example 2 of European patent Specification No. 68,311 are reduced at 300° C. in a gas mixture, flowing at a rate of 100 liter/hour, of 60 parts of nitrogen and 40 parts of hydrogen for 30 minutes. A black-yellow, shiny, magnetic pigment, the iron oxide content of which consists of 40 parts of $Fe_2O_3$ (haematite) and 60 parts of $Fe_3O_4$ (magnetite), is obtained.

EXAMPLE 3

170 ml of a 10% by weight solution of $TiCl_4$ in water are slowly added dropwise to a suspension of 50 g of a pigment prepared according to Example 2 of European Patent Specification No. 68,311 in 1,500 ml of water at 75° C. and at a pH of 2, the pH being kept constant by simultaneous dropwise addition of a 10% sodium hydroxide solution. Thereafter, the mixture is subsequently stirred for a further 45 minutes and the pigment is filtered off, washed with water, dried at 90° C. and annealed at 900° C. for 30 minutes.

The shiny, deep red-violet pigment thus obtained is reduced in accordance with Example 1, a shiny black pigment with a red-violet shimmer being obtained.

EXAMPLE 4

A solution of 66.67 g of $KCr(SO_4)_2 \times 12\ H_2O$ in 400 ml of water is slowly added dropwise to a suspension of 50 g of a pigment prepared according to Example 2 of European patent Specification 68,311 in 1,500 ml of water at 75° C. and at a pH of 2, the pH being kept constant by simultaneous addition of a 12.5% ammonia solution. After the mixture has been subsequently stirred for 15 minutes, a solution of 10 g of $Na_2HPO_4 \times 12\ H_2O$ in 100 ml of water is added dropwise and the pigment is filtered off, washed with water, dried at 120° C. and annealed at 800° C. for 30 minutes. The olive-brown shiny pigment thus obtained is reduced according to Example 1, a shiny black pigment with a green shimmer being obtained.

EXAMPLE 5

500 ml of a 10% by weight solution of $SnCl_4 \times 5\ H_2O$ are added dropwise to a suspension of 50 g of a pigment prepared according to Example 2 of European Patent Specification No. 68,311 in 1,500 ml of water at 75° C. and at a pH of 2, the pH being kept constant by simultaneous addition of 10% sodium hydroxide solution. After the mixture has been subsequently stirred for 30 minutes, the pigment is filtered off, washed with water, dried at 120° C. and annealed at 800° C. for 30 minutes. The dark red shiny pigment thus obtained is reduced in accordance with Example 1, a shiny black pigment with a red shimmer being obtained.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A platelet-shaped pigment containing iron oxide and aluminum oxide in solid solution, of the formula $Al_xFe_{2-x}O_{3-y}$, wherein x is 0.02 to 0.5 and y is 0.3 to 1.0.

2. A pigment according to claim 1, additionally containing at least one oxide of group II, IV, V or VI of the periodic table.

3. A platelet-shaped pigment prepared by heating a pigment of the formula $Al_xFe_{2-x}O_3$, wherein x has a value from 0.02 to 0.5, at a temperature of about 200°–800° C. in a reducing atmosphere.

4. A pigment according to claim 3, wherein the heating is conducted for about 10–100 minutes.

5. A pigment according to claim 3, wherein the heating is conducted for about 20–40 minutes and at a temperature of about 300°–500° C.

6. A pigment according to claim 3, wherein before or after heating, the pigment is coated with at least one group II, IV, V or VI metal oxide in an amount of about 1–60% by weight.

7. In a pigmented coating composition, the improvement wherein the pigment is a pigment of claim 1.

8. A pigmented lacquer composition, according to claim 7.

9. A pigmented paint composition, according to claim 7.

10. In a pigmented plastic composition, the improvement wherein the pigment is a pigment of claim 1.

11. A pigmented fiber composition, wherein the pigment is a pigment of claim 1.

12. A pigmented glass composition, wherein the pigment is a pigment of claim 1.

13. A pigmented ceramic composition, wherein the pigment is a pigment of claim 1.

14. A pigmented cosmetic composition, wherein the pigment is a pigment of claim 1.

15. A pigmented printing ink composition, wherein the pigment is a pigment of claim 1.

16. A pigment according to claim 2, wherein the oxide of group II, IV, V or VI is an oxide of zinc, zirconium, titanium, chromium, silicon, tin or bismuth.

* * * * *